US010965789B2

(12) United States Patent
Leung et al.

(10) Patent No.: US 10,965,789 B2
(45) Date of Patent: Mar. 30, 2021

(54) METHOD AND SYSTEM FOR UPDATING A WHITELIST AT A NETWORK NODE

(71) Applicant: Pismo Labs Technology Limited, Kowloon (HK)

(72) Inventors: Wan Chun Leung, New Territories (HK); Kit Wai Chau, Kowloon (HK); Patrick Ho Wai Sung, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 15/947,777

(22) PCT Filed: Mar. 23, 2017

(86) PCT No.: PCT/IB2017/051684
§ 371 (c)(1),
(2) Date: Apr. 7, 2018

(87) PCT Pub. No.: WO2018/172819
PCT Pub. Date: Sep. 27, 2018

(65) Prior Publication Data
US 2020/0021671 A1    Jan. 16, 2020

(51) Int. Cl.
*H04L 29/06* (2006.01)
*G06F 16/955* (2019.01)
*H04L 29/12* (2006.01)

(52) U.S. Cl.
CPC .......... *H04L 69/16* (2013.01); *G06F 16/9566* (2019.01); *H04L 61/1511* (2013.01);
(Continued)

(58) Field of Classification Search
CPC ..... H04L 69/16; H04L 67/32; H04L 61/1511; H04L 61/30; H04L 63/0876; H04L 63/10;
(Continued)

(56) References Cited

U.S. PATENT DOCUMENTS 9,369,434 B2 * 6/2016 Kim ................. H04L 63/0227
10,516,694 B1 * 12/2019 Gupta ............... H04L 63/1458
(Continued)

FOREIGN PATENT DOCUMENTS

| CN | 101567888 A | 10/2009 |
| CN | 106304141 A | 1/2017 |
| CN | 106452721 A | 2/2017 |

OTHER PUBLICATIONS

Iturbe et al, "Visualizing Network Flows and Related Anomalies in Industrial Networks using Chord Diagrams and Whitelisting", in proceeding of the 11th Joint Conference on Computer Vision, Imaging and Computer Graphics and Applications, vol. 2: IVAPP, pp. 101-108, 2016.*

(Continued)

*Primary Examiner* — Ian N Moore
*Assistant Examiner* — Sun Jong Kim
(74) *Attorney, Agent, or Firm* — Fisherbroyles, LLP

(57) ABSTRACT

A method and a system for updating a first whitelist at a network node. The network node receives data packets from an Internet of Things (IoT) device and determines a predetermined identifier for the IoT device. The network node then determines whether the predetermined identifier is in the first whitelist. When the predetermined identifier is not in the first whitelist, the network node starts a first time period. When the predetermined identified is on the first whitelist, the network node determines whether the data packets are received within the first time period. When the data packets are received within the first time period, the network node identifies destination addresses of the data packets and updates the first whitelist based on the destination addresses and the predetermined identifier. The updated first whitelist is stored in non-transitory computer readable storage medium in the network node.

21 Claims, 11 Drawing Sheets

(52) U.S. Cl.
CPC ........ *H04L 61/2076* (2013.01); *H04L 61/303* (2013.01); *H04L 63/0876* (2013.01); *H04L 63/10* (2013.01)

(58) Field of Classification Search
CPC . H04L 63/0807; H04L 63/1458; H04L 63/45; H04L 67/146; H04L 69/22; H04L 45/021; H04L 45/74; H04L 61/2076; G06F 16/955; G06F 21/00; H04W 12/08; H04W 8/28
See application file for complete search history.

(56) References Cited

U.S. PATENT DOCUMENTS

| | | | | |
|---|---|---|---|---|
| 2004/0201631 | A1* | 10/2004 | Keller | G06F 16/9566 715/853 |
| 2009/0029693 | A1* | 1/2009 | Liwell | H04M 15/00 455/419 |
| 2013/0336312 | A1* | 12/2013 | Kimura | H04L 29/06176 370/352 |
| 2014/0019601 | A1 | 1/2014 | Blacka et al. | |
| 2015/0071139 | A1* | 3/2015 | Nix | H04W 12/0013 370/311 |
| 2017/0061074 | A1* | 3/2017 | Singh | G16H 40/67 |
| 2017/0147810 | A1* | 5/2017 | Richardson | G06F 21/50 |
| 2018/0234339 | A1* | 8/2018 | Uchizumi | H04L 61/2015 |
| 2018/0241739 | A1* | 8/2018 | Takazoe | G06F 21/44 |

OTHER PUBLICATIONS

IANA Considerations and IETF Protocol and Documentation Usage for IEEE 802 Parameters, Internet Engineering Task Force RFC 7042, Oct. 2013. (Year: 2013).*
International Search Report in International Application No. PCT/IB2017/051684, dated Dec. 28, 2017.
Written Opinion of the international Searching Authority in International Application No. PCT/IB2017/051684, dated Dec. 28, 2017.

* cited by examiner

US 10,965,789 B2

METHOD AND SYSTEM FOR UPDATING A WHITELIST AT A NETWORK NODE

TECHNICAL FIELD

The present invention relates in general to the field of updating a whitelist at a network node. More particularly, the present invention relates to updating a whitelist with destination addresses that are allowed to receive data from Internet of Things (IoT) devices.

BACKGROUND ART

Distributed Denial of Service (DDoS) attacks causing widespread disruption of legitimate internet activity are known. Massive amounts of business activities are being disrupted and massive economic loss is being suffered. Internet of Things (IoT) device infected with malicious code, can be used for landing DDoS attack. As there could be many IoT devices in a network, infected IoT devices may launch DDoS attack from the network. This is undesirable for operator of the network.

Further infected or uninfected IoT devices may send data to destinations that the operator of network does not want to. Not only such data transmission consumes network resources, confidential information, privacy, trade secrets could be compromised. Administrator of the network may have limited ability to configure most IoT devices as the IoT devices may not be configurable or under control of the vendors of the IoT devices. Presence of IoT devices in a network could be a security risk.

SUMMARY OF THE INVENTION

The present invention discloses method and system for updating a whitelist at a network node. When the network node receives data packets from an IoT device, the network node then determines a predetermined identifier for the IoT device. The network node determines whether the predetermined identifier is in the first whitelist. If the predetermined identifier is not in the first whitelist, the network node starts a first time period. If the predetermined identified is on the first whitelist, the network node determines whether the data packets are received within the first time period. If the data packets are received within the first time period, the network node identifies destination addresses of the data packets and updates the first whitelist based on the destination addresses and the predetermined identifier. The updated first whitelist is stored in non-transitory computer readable storage medium in the network node. The network node restricts data packet transmission based on the updated first whitelist after expiration of the first time period. The first time period is less than one hour.

According to one of the embodiments of the present invention, the predetermined identifier is Media Access Control (MAC) address of the IoT device. The destination addresses include Internet Protocol (IP) address and/or Uniform Resource Locator (URL).

According to one of the embodiments of the present invention, the network node identifies maximum data packet transmission rate of the IoT device and updates the first whitelist with the maximum data packet transmission rate of the IoT device. The network determines data packet transmission rate of the IoT device to the destination addresses on the first whitelist; wherein the maximum data packet transmission rate of the IoT device is used for restricting data transmission rate of the IoT device to the destination addresses on the first whitelist; and wherein no data packets from the IoT device are allowed to be transmitted to destination addresses not on the first whitelist.

According to one of the embodiments of the present invention, the network node resets the first time period after receiving an instruction from an administrator of the network node. A user interface for the network node is provided for the administrator to send the instruction of resetting the first time period.

According to one of the embodiments of the present invention, the network node retrieves destination addresses of the IoT device from a server and updates the first whitelist based on the destination addresses retrieved from the server.

DETAILED DESCRIPTIONS

Figure 1:
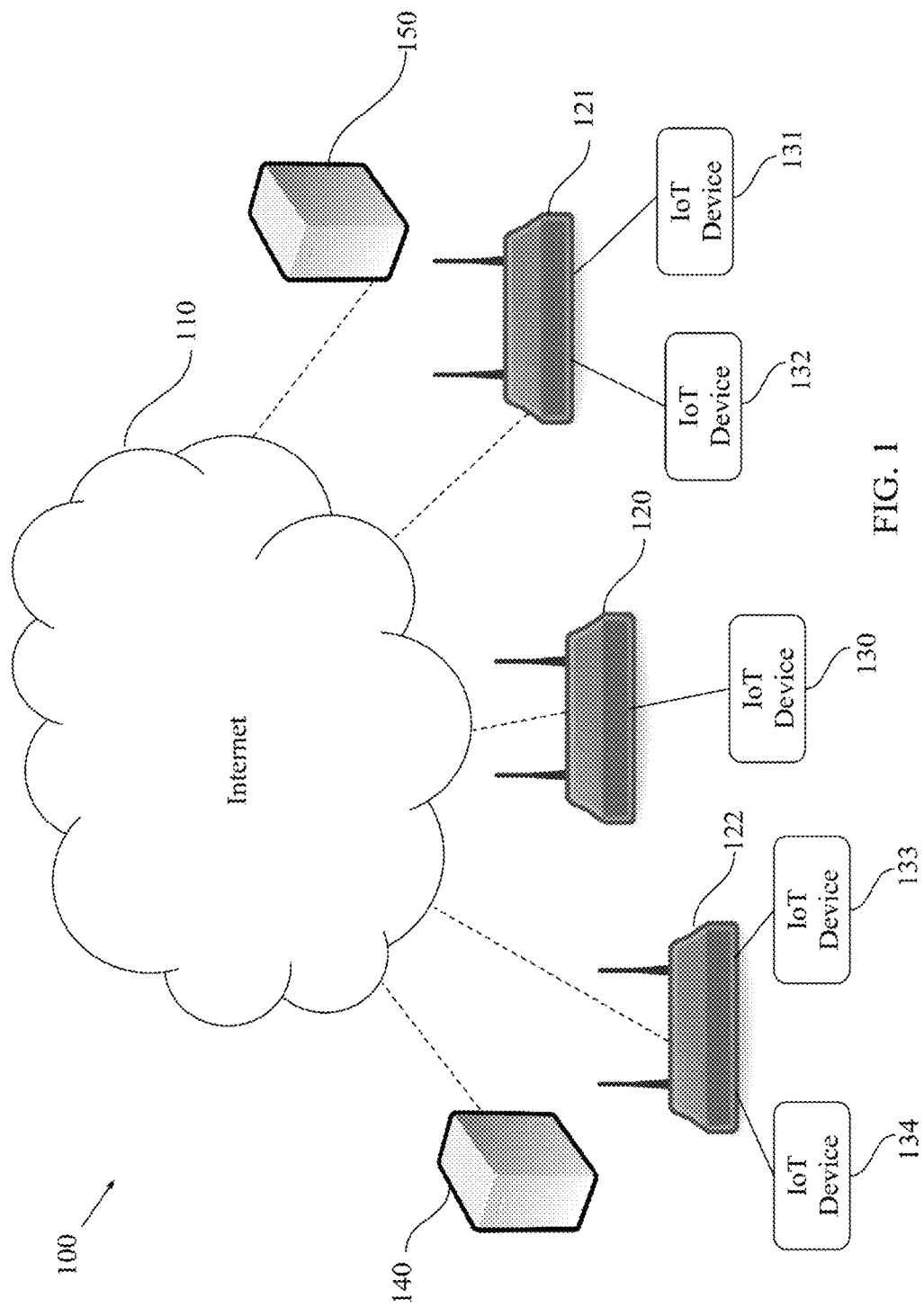
FIG. 1 illustrates a network configuration according to one of the embodiments of the present invention.

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage unit. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data. etc. may be passed, forwarded, or transmitted via any suitable means including memory sharing, message passing, token passing, network transmission, etc. A processing unit (s) can be realized by virtualization, and can be a virtual processing unit(s) including a virtual processing unit in a cloud-based instance.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The program instructions may, in certain embodiments, be downloaded via computer networks such as the Internet, an intranet, LAN, MAN, WAN, the PSTN, a satellite communication system, a cable transmission system, and/or the like.

FIG. 1 illustrates a network configuration according to one of the embodiments of the present invention. Network 100 includes Internet 110, a plurality of network nodes 120, 121 and 122, a plurality of IoT devices 130, 131, 132, 133 and 134, server 140 for network node 120 and server 150 provided by a whitelist service provider.

In one embodiment, network node 120 receives and forwards data packets from IoT device 130. Network node 120 may be a firewall gateway, a router, a switch, an access point, or any device capable of receiving and forwarding data packets. IoT device 130 generates and sends data packets to destination addresses via network node 120 and Internet 110. IoT device 130 may be a surveillance camera, thermostats, cars, lights, refrigerators, any device capable of generating and sending data packets to destination addresses via Internet 110.

Network node 120 receives data packets from IoT device 130 and then sends the received data packets to destination addresses via Internet 110. The destination addresses are allowed to receive data packets from IoT device 130. Network node 120 uses a whitelist to allow data packets to be sent to the destination addresses.

Figure 2:
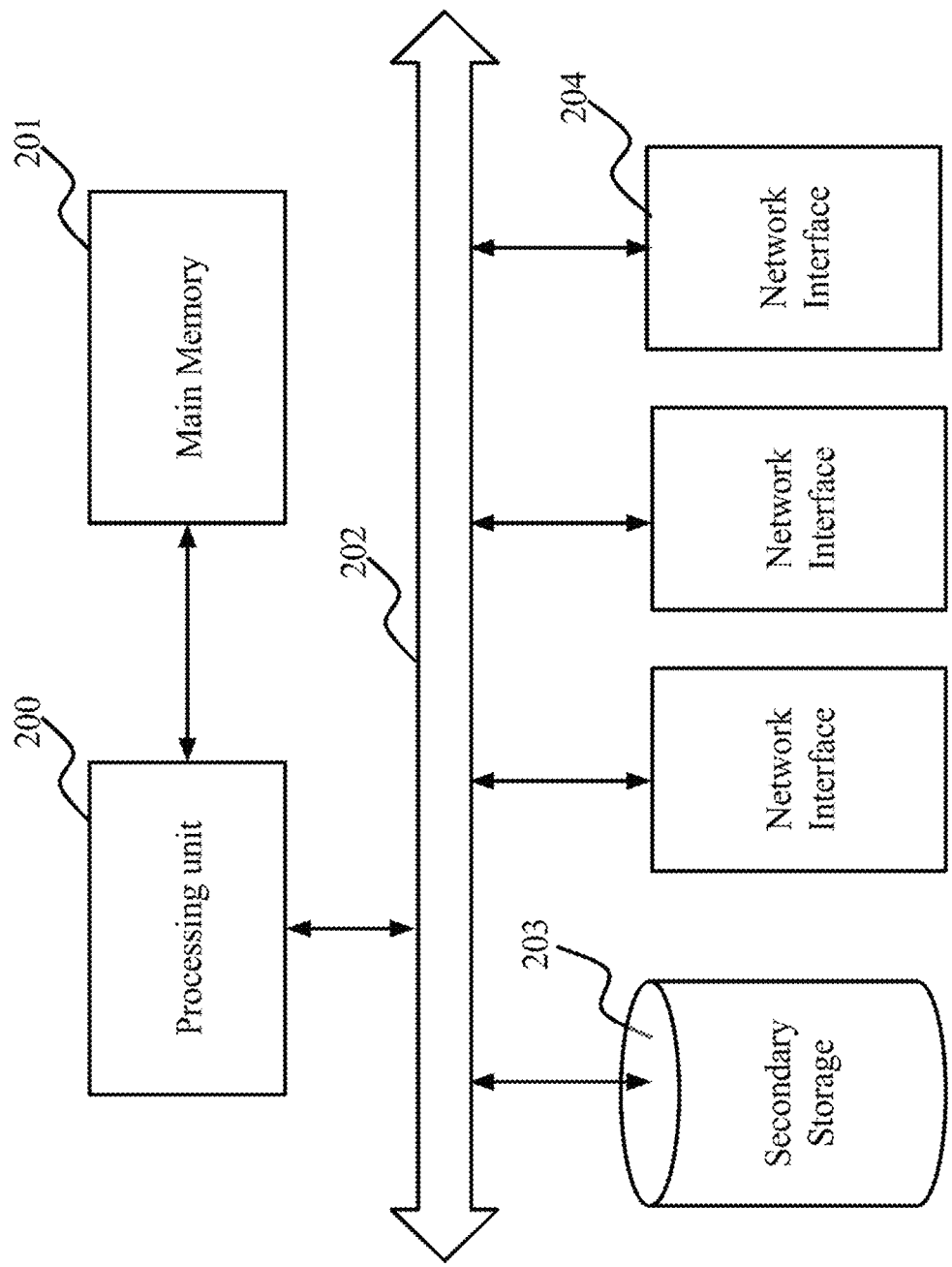
FIG. 2 is a block diagram of a network node according to one of the embodiments of the present invention.

FIG. 2 is an illustrative block diagram of network node 120 according to one of the embodiments of the present invention. Network node 120 comprises processing unit 200, main memory 201, system bus 202, secondary storage 203, and plurality of network interfaces 204. Processing unit 200 and main memory 201 are connected to each other directly. System bus 202 connects processing unit 200 directly or indirectly to secondary storage 203, and plurality of network interfaces 204. Using system bus 202 allows network node 120 to have increased modularity. System bus 202 couples processing unit 200 to secondary storage 203, and plurality of network interfaces 204. System bus 202 can be any of several types of bus structures including a memory bus, a peripheral bus, and a local bus using any of a variety of bus architectures. Secondary storage 203 stores program instructions for execution by processing unit 200.

Secondary storage 203 further stores conditions, wherein classification of established end-to-end connections into different groups depends on whether or not the established end-to-end connections satisfy the conditions.

In one particular embodiment, a network node whitelist used by network node 120 is stored in secondary storage 203 of network node 120. Network node 120 determines whether destination addresses of data packets originated from IoT device 130 are on the whitelist for IoT device 130. If the destination addresses are on the network node whitelist, network node 120 allows data packets to be transmitted to the destination addresses. If the destination addresses are not on the network node whitelist, network node 120 does not allow data packets to be transmitted to the destination addresses. The data packets are then dropped and/or a response is sent to IoT device 130 to indicate that the data packets are not transmitted to the destination addresses.

Figure 3A:
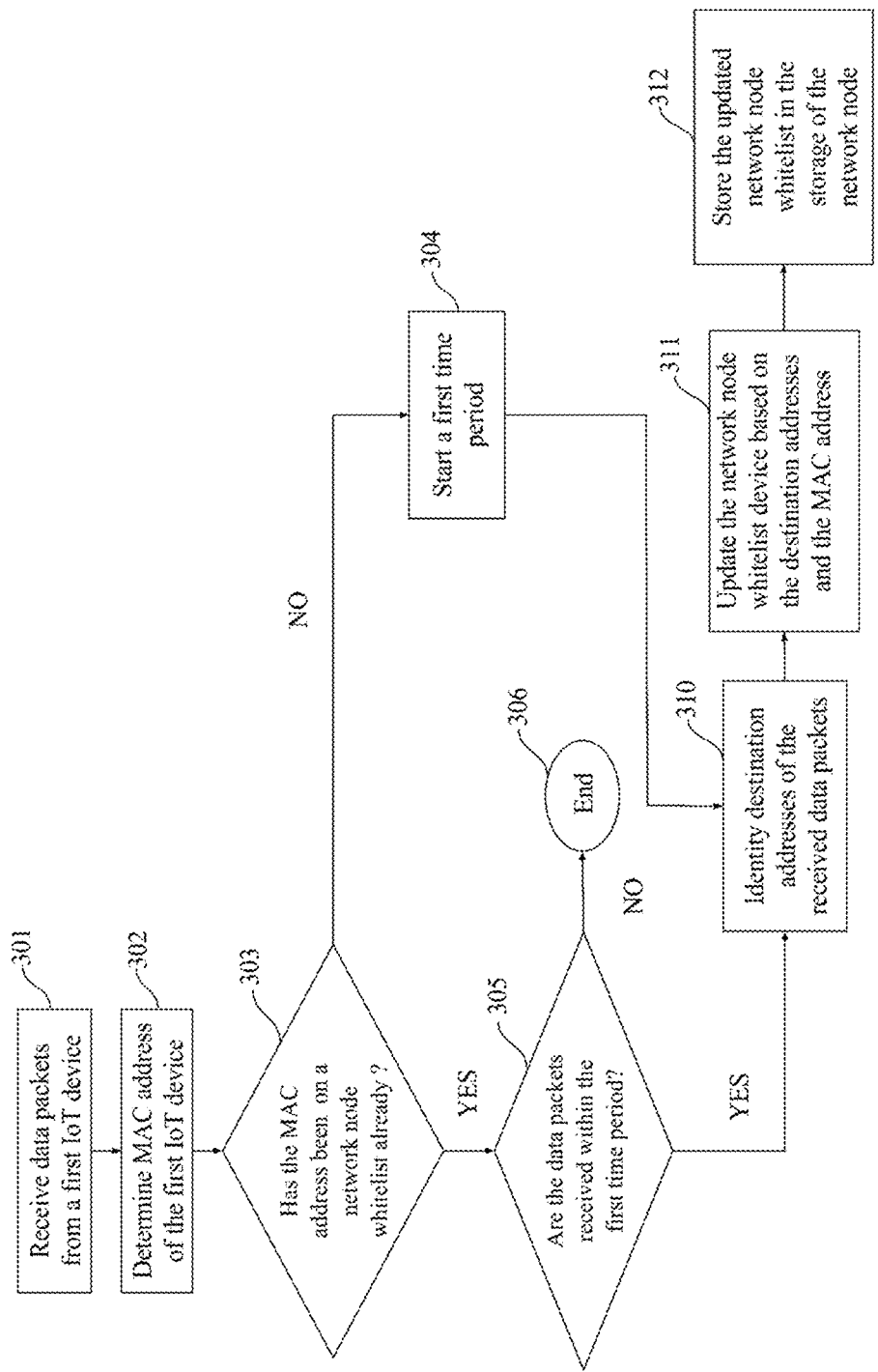
FIG. 3A illustrates a workflow to update a network node whitelist based on destination addresses of data packets identified within a first time period according to one of the embodiments of the present invention.

FIG. 3A illustrates an exemplary embodiment of workflow of updating a network node whitelist based on destination addresses of data packets identified within a first time period. One of the benefits of the workflow is that the network node whitelist is updated by the network node itself.

IoT device 130 has its own media access control (MAC) address that is able to be used for distinguishing IoT device 130 from other IoT devices. MAC has six octets and the first three octets of MAC address refer to an Organizationally Unique Identifier (OUI). The OUI is a 24-bit number that uniquely identifies a vendor, which is assigned by the IEEE. A full MAC address, OUI of MAC address or OUI combined with any bits of the last three octets of MAC address can be used for identification.

At block 301, processing unit 200 of network node 120 receives data packets from IoT device 130. At block 302, processing unit 200 determines MAC address of IoT device 130. At block 303, processing unit 200 determines whether the MAC address is on a network node whitelist. If the MAC address is not on the network node whitelist, processing unit 200 starts a first time period at 304.

The first time period, for example, is set to one hour from the time that processing unit 200 received the first data packets from IoT device 130. There is no limitation that the first time period must be one hour. For example, the first time period can be as short as two minutes or even longer than a month. The first time period is a period of time for processing unit 200 to identify destination addresses of the received data packets. It is preferred not to set the first time period longer than three hours otherwise, processing unit 200 will update for a long period of time and computing resources and/or networking resources will not be used effectively. Further, if the first time period is too long, IoT device 130 may be hacked. Then the destination addresses on the network node whitelist may include undesired Internet Protocol (IP) address or Uniform Resource Locator (URL) and reduce the effectiveness of having the whitelist.

Processing unit 200 then identifies the destination addresses of the received data packets within the first time period at block 310. At block 311, the network node whitelist is updated based on the MAC address and the destination addresses such as IP address, domain name and URL. At block 312, the updated whitelist is stored in secondary storage 203.

At block 303, if the MAC address is on the network node whitelist, processing unit 200 will determine whether the data packets is received within the first time period at block 305. If the data packets is received within the first time period, actions at block 310 to block 312 will be performed. At block 305, if the data packets is received after expiration of the first time period, the workflow will end at block 306.

Figure 3B:
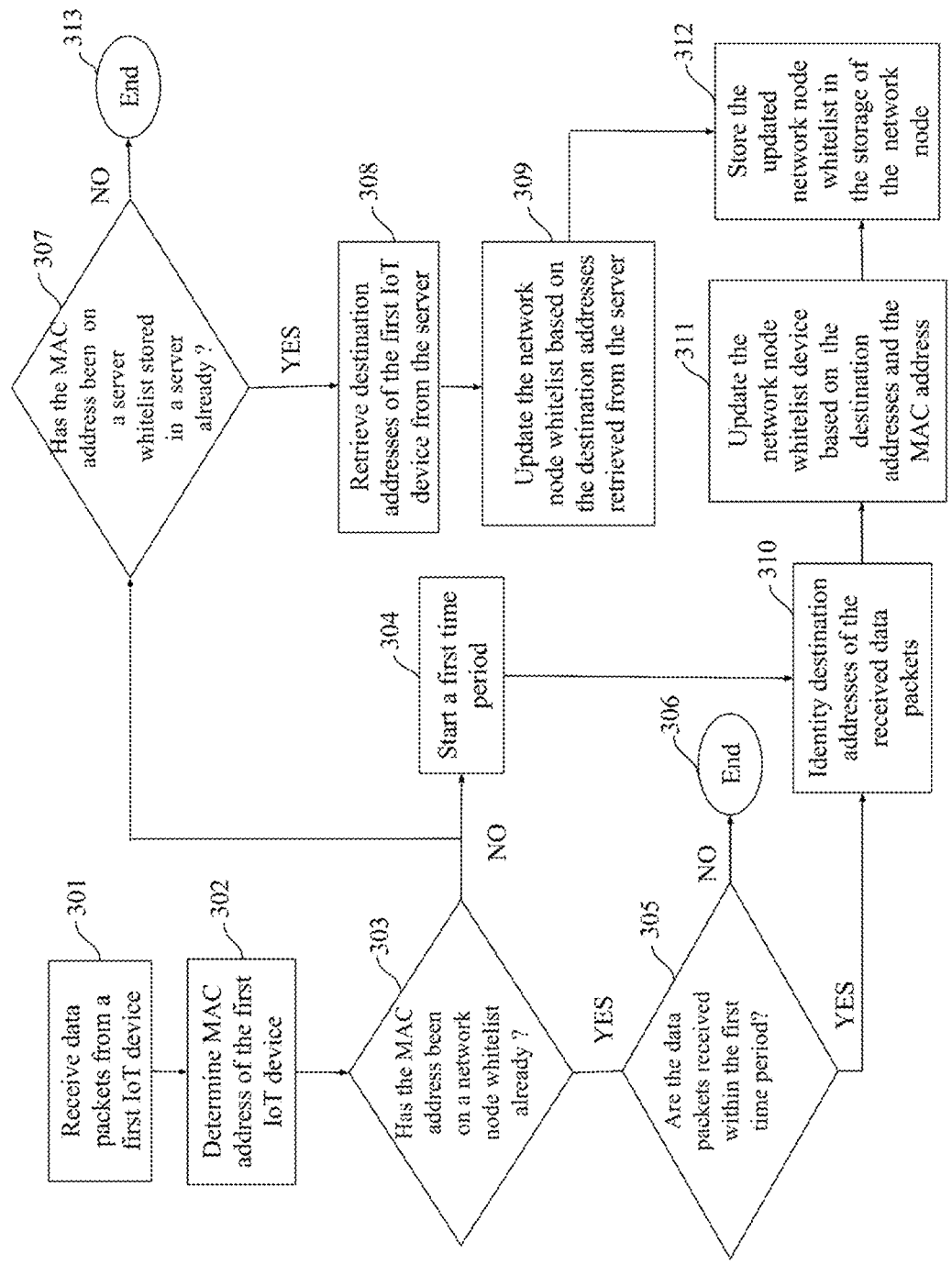
FIG. 3B illustrates an alternative workflow of FIG. 3A to update a network node whitelist based on destination addresses of data packets identified within a first time period at the network node and destination addresses retrieved from a server for the network node according to one of the embodiments of the present invention.

FIG. 3B illustrates an exemplary embodiment of an alternative workflow of FIG. 3A to update a network node whitelist based on destination addresses of data packets identified within a first time period and destination addresses retrieved from a server. One of the benefits of the workflow is that destination addresses of the IoT device are able to be obtained from the server.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305, block 310, block 311 and block 312 will be performed.

At block 303, if the MAC address is not on the network node whitelist, processing unit 200 will perform actions at block 304 and block 307 concurrently. At block 304, processing unit 200 starts a first time period. Actions at block 310, block 311 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 from the server at block 308. Processing unit 200 then updates the network node whitelist based on the destination addresses retrieved from server 140 at block 309. The updated network whitelist will be stored in secondary storage 203.

Figure 3C:
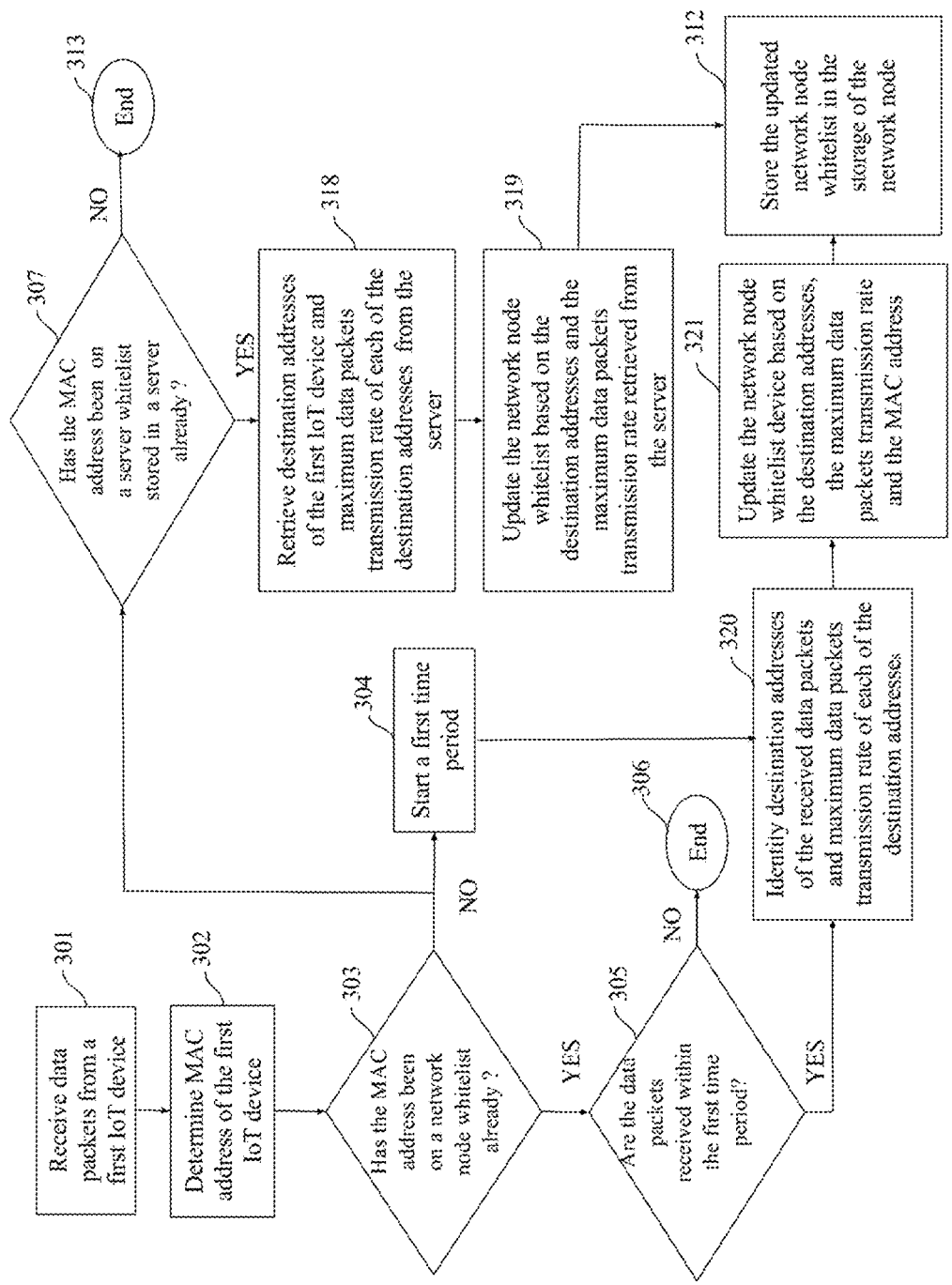
FIG. 3C illustrates an alternative workflow of FIG. 3B to update a network node whitelist based on destination addresses of data packets identified within a first time period and maximum data packet transmission rate of each of the destination addresses, and destination addresses of an IoT device and maximum data packet transmission rate of each the destination addresses retrieved from a server according to one of the embodiments of the present invention.

FIG. 3C illustrates an exemplary embodiment of an alternative workflow of FIG. 3B to update a network node whitelist for IoT device 130 based on destination addresses of data packets identified within a first time period and maximum data packet transmission rate of each of the destination addresses. Also, destination addresses of IoT device 130 and maximum data packet transmission rate of each of the destination addresses are retrieved from server 140 in order for network node 120 to update the network node whitelist. One of the benefits of the workflow is that data packet transmission rate of the destination addresses that are not on the network node whitelist is restricted.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305 will be performed. At block 320, processing unit 200 then identifies destination addresses of the received data packets within the first time period and maximum data packet transmission rate of each of the destination addresses. At block 321, the network node whitelist is updated based on the MAC address, the destination addresses and the maximum data packet transmission rate of each of the destination addresses. At block 312, the updated whitelist is stored in secondary storage 203.

At block 303, if the MAC address is not on the network node whitelist, processing unit 200 will perform actions at block 304 and block 307 concurrently. At block 304, processing unit 200 starts a first time period. Actions at block 320, block 321 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 and maximum data transmission rate of each of the destination addresses from server 150 at block 318. Processing unit 200 then updates the network node whitelist based on the destination addresses and the maximum data packet transmission rate retrieved from server 140 at block 309. The updated network whitelist will be stored in secondary storage 203.

In one particular embodiment, processing unit 200 determines data packet transmission rate of IoT device 130 to each of the destination addresses on the network node whitelist. The data packet transmission rate of IoT device 130 to each of the destination addresses on the network node whitelist is not allowed to exceed the corresponding maximum data packet transmission rate after expiration of the first time period. For destination addresses not on the network node whitelist, no data packets are allowed to be transmitted to theses addresses after expiration of the first time period. One of the benefits to restrict maximum data packet transmission rate is to control the amount of data being transmitted, and may limit the amount of network resources consumed by IoT devices.

In one variant, for destination addresses on the network node whitelist, data packet transmission rate of IoT device 130 to each of these destination addresses is not allowed to exceed the corresponding maximum data packet transmission rate of the destination addresses after expiration of the first time period. For destination addresses not on the network node whitelist, data packet transmission of these destination addresses is limited to a threshold, for example, 10 kbps, 20 kbps or 100 kbps, after expiration of the first time period. One of the benefits to restrict data packet transmission rate is a threshold to allow IoT device 130 to communicate to new destinations after the expiration of the first time period while limiting the impact in case IoT device 130 is being used to launch DDoS attack.

In one particular embodiment, the user or the administrator is allowed to enter the maximum data packet transmission rate of each of the destination addresses, instead of detecting the maximum data packet transmission rate of each of the destination addresses by network node 120.

Figure 3D:
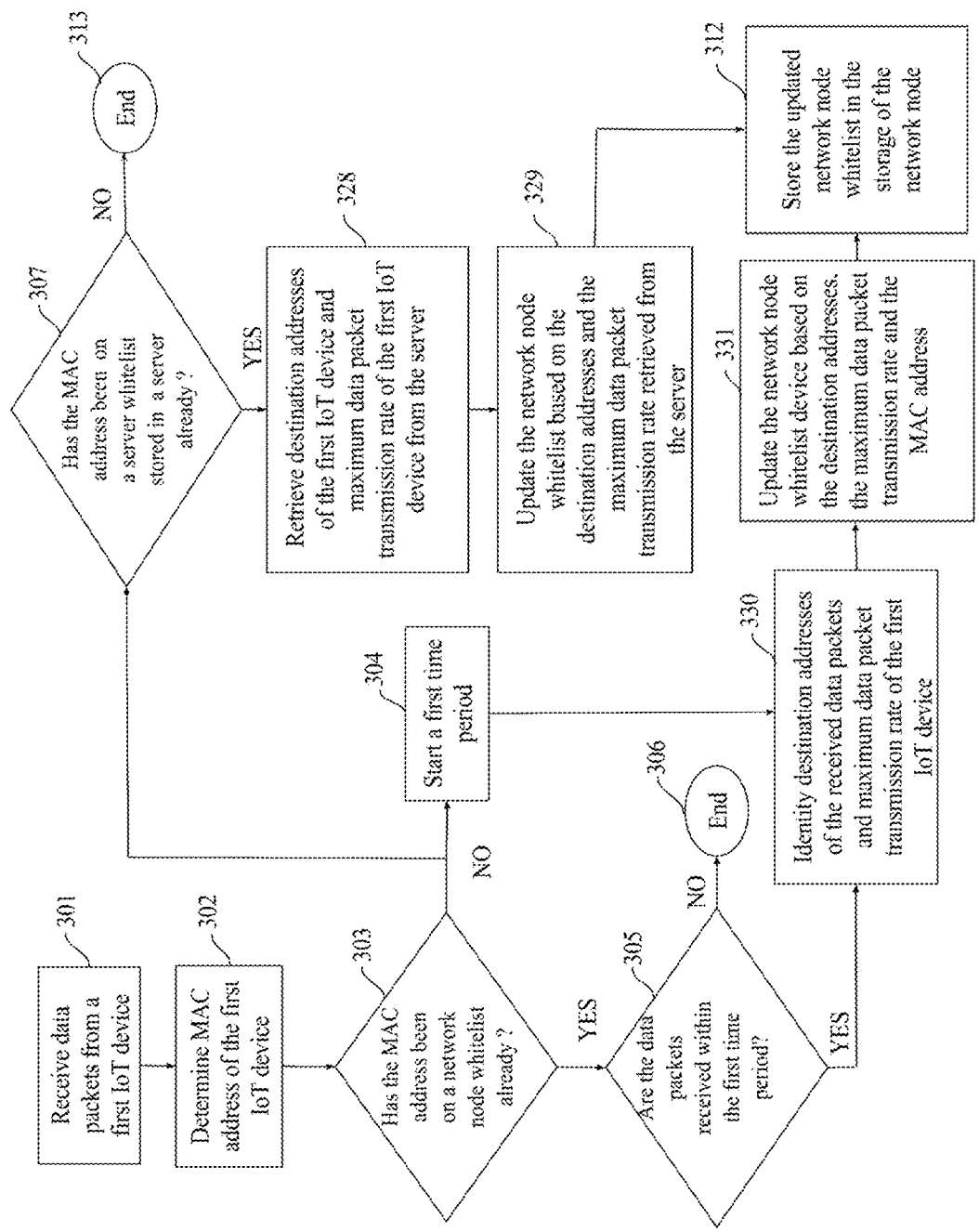
FIG. 3D illustrates an alternative workflow of FIG. 3C to update a network node whitelist based on destination addresses of data packets identified, maximum data packet transmission rate of an IoT device within a first time period, and destination addresses of the IoT device and maximum data packet transmission rate of the IoT device according to one of the embodiments of the present invention.

FIG. 3D illustrates an exemplary embodiment of an alternative workflow of FIG. 3C to update a network node whitelist based on destination addresses of data packets identified, maximum data packet transmission rate of an IoT device within a first time period, and destination addresses of the IoT device and maximum data packet transmission rate of the IoT device. For example, the maximum data packet transmission rate is measured based on total data packet transmission rate from an IoT device to all destinations within a specific time period. The highest data packet transmission rate is taken as maximum data packet transmission rate. For example, at a particular time, data transmission rate from the IoT device to address A is 10 kbps, to address B is 40 kbps and to address C is 25 kbps respectively, the total data packet transmission rate is therefore 75 kbps. If 75 kbps is the highest data packet transmission rate during the specific time period, the maximum data packet transmission rate for the IoT device is 75 kbps.

One of the benefits of the workflow is that total data packet transmission rate of the destination addresses being not on the network node whitelist is not allowed to exceed the maximum data packet transmission rate or even no data packet transmission for these destination addresses is allowed, in order to mitigate network traffic overflow.

At block 301, processing unit 200 of network node 120 receives data packets from IoT device 130. At block 302, processing unit 200 determines MAC address of IoT device 130. At block 303, processing unit 200 determines whether the MAC address is on a network node whitelist stored in storage 203. If the MAC address is on the network node whitelist, actions at block 305 will be performed. At block 330, processing unit 200 then identifies destination addresses of the received data packets and maximum data packet transmission rate of IoT device 130 within the first time period. At block 331, the network node whitelist is updated based on the MAC address, the destination addresses and the maximum data packet transmission rate. At block 312, the updated whitelist is stored in secondary storage 203.

At block 303, if the MAC address is not on the network node whitelist, processing unit 200 will perform actions at block 304 and block 307 concurrently. At block 304, processing unit 200 starts a first time period. Actions at block 330, block 331 and block 312 will be performed.

At block 307, processing unit 200 communicates with server 140 and then determines whether the MAC address is on a server whitelist. If the MAC address is on the server whitelist, processing unit 200 retrieves destination addresses of IoT device 130 and maximum data transmission rate of IoT device 130 from server 150 at block 328. Processing unit 200 then updates the network node whitelist based on the destination addresses and the maximum data packet transmission rate retrieved from server 140 at block 329. The updated network whitelist will be stored in secondary storage 203.

In one particular embodiment, processing unit 200 determines total data packet transmission rate of IoT device 130 to the destination addresses on the network node whitelist. The total data packet transmission rate of IoT device 130 to the destination addresses on the network node whitelist is not allowed to exceed the maximum data packet transmission rate of IoT device 130 after expiration of the first time period. For destination addresses not on the network node whitelist, no data packets are allowed to be transmitted to theses addresses after expiration of the first time period.

In one variant, for destination addresses on the network node whitelist, total data packet transmission rate of IoT device 130 to these destination addresses is allowed to exceed the maximum data packet transmission rate of IoT device 130 after expiration of the first time period. For destination addresses not on the network node whitelist, total data packet transmission rate of IoT device 130 to theses destination addresses is not allowed to exceed the maximum data packet transmission rate of IoT device 130 after expiration of the first time period.

In one particular embodiment, if a user of IoT device 130 or an administrator of network node 120 tries to update the network node whitelist after the expiration of the first time period, the user or the administrator is allowed to reset the network node whitelist by using an input interface, for example, a button, a knob, a keypad and a display panel. Once the network node whitelist is reset, new destination addresses can then be added to the network node whitelist. Network node 120 performs the workflow as illustrated in FIG. 3A, FIG. 3B, FIG. 3C or FIG. 3D.

One particular detailed embodiment, after the reset, all destination addresses on the network node whitelist removed. New destination addresses are required to be added to the network node whitelist again.

In one variant, after the reset, destination addresses on the network node whitelist are not removed. New destination addresses are then learnt during the new first time period. This allows more destination addresses to be added to the network node whitelist. This is particularly useful after the IoT device 130 is upgraded or is updated as IoT device 130 may legitimately visit legitimate destination addresses.

In one particular embodiment, the user or the administrator is allowed to approve the updated network node whitelist before network node 120 uses the updated network node whitelist for restricting data packets transmission. If no deficiencies are identified in the updated network node whitelist, the updated network node whitelist will be approved. If deficiencies are identified in the updated network node whitelist, the user is allowed to amend and then approve the network node whitelist. Once the network node whitelist is approved, network node 120 implements the network node whitelist to transmit data to the destination addresses on the network node whitelist.

In one particular embodiment, the user or the administrator is allowed to enter the maximum data packet transmission rate of IoT device 130, instead of detecting the maximum data packet transmission rate of IoT device 130 by network node 120.

In one particular embodiment, network node 120 generates and sends an analytical report to the user or the administrator on a regular basis. For example, the analytical report is generated and sent to the user or the administrator every day at midnight or the analytical report is generated and sent to the user or the administrator every Monday at midnight.

The analytical report includes destination addresses on the whitelist- and destination addresses not on the whitelist. The analytical report further includes data packets transmission rate of each of the destination addresses. In one particular detail, the analytical report also includes number of requests to desired addresses and non-desired addresses. The analytical report may be used to help the user or the administrator to determine whether an IoT device is hacked or is visiting unknown destination addresses. Further the analytical report may assist the user or the administrator to add or remove desired destination addresses to the whitelist. The analytical report is sent as an email and/or message, and/or are shown as a web page and/or document. In one variant, the analytical report is sent to a third party, such as the whitelist service provider for further analysis. The whitelist service provider then provides suggestions or amendments to the whitelist based on the analytical report.

Figure 4A:
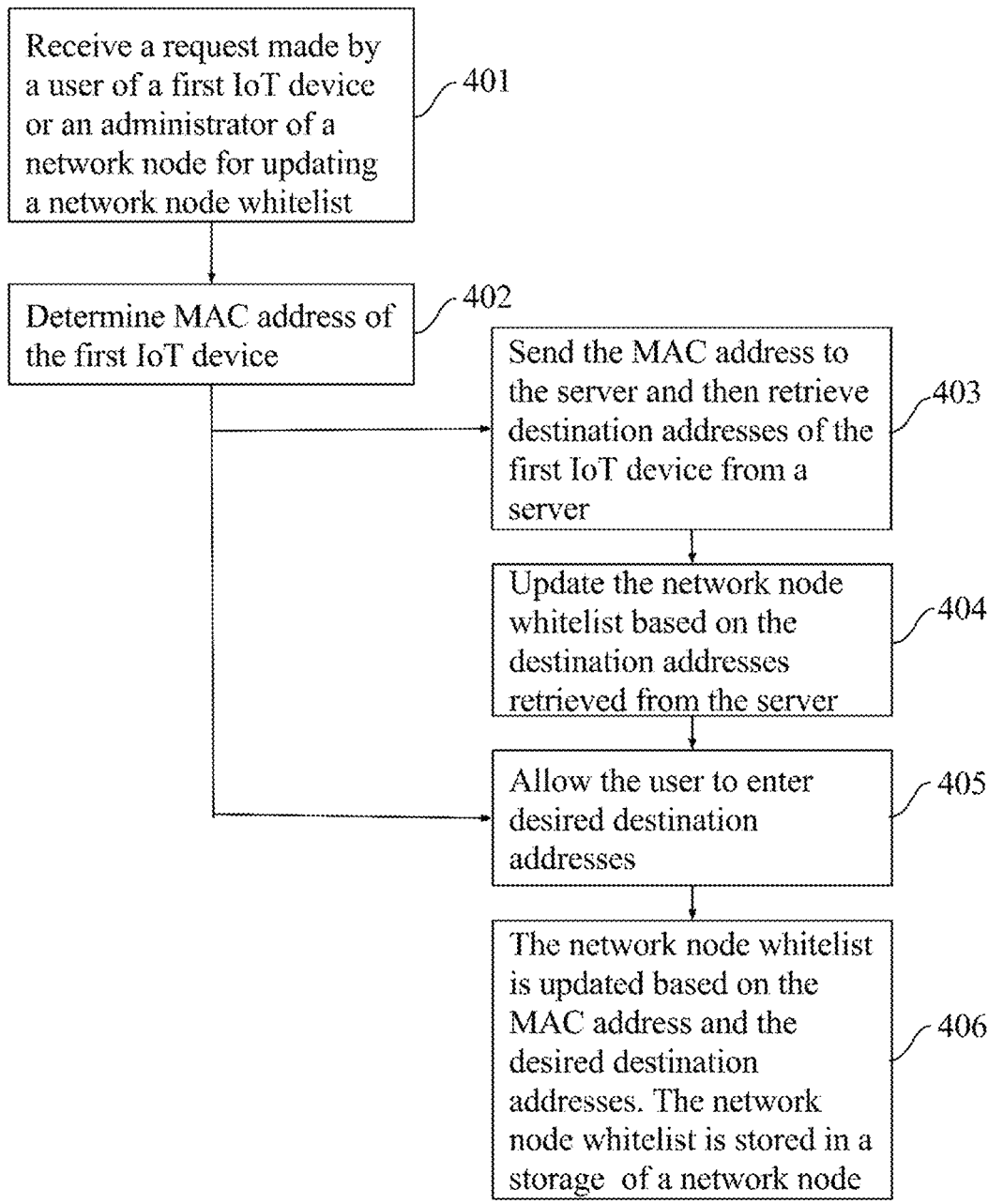
FIG. 4A illustrates a workflow of updating a network node whitelist based on desired destination addresses entered by a user of an IoT device or an administrator of a network node and MAC address of the IoT device according to one of the embodiments of the present invention.

FIG. 4A illustrates an exemplary embodiment of workflow of updating a network node whitelist based on desired destination addresses entered by a user of an IoT device or an administrator of a network node and MAC address of the IoT device. One of the benefits is that the user or the administrator updates a network node whitelist with desired destination addresses whenever the user or the administrator wishes to do.

At block 401, processing unit 200 of network node 120 receives a request made by a user of IoT device 130 or an administrator of network node 120 for updating a network node whitelist via for example an input interface, an application programming interface (API) or network. The input interface includes a webpage. At block 402, processing unit 200 determines MAC address of IoT device 130. Actions at block 403 and 405 will then be performed concurrently. At block 405, the user or the administrator is allowed to enter desired destination addresses via the webpage. For example, the desired destination addresses include port number, port range, domain name, URL, and IP address. At block 406, the network node whitelist is updated based on the desired destination addresses and the MAC address. The updated network node whitelist is stored in secondary storage 203.

At block 403, processing unit 200 sends the MAC address to server 140 and retrieves destination addresses of IoT device 130 from server 140 if the MAC address is on a server whitelist. At block 404, processing unit 200 updates the network node whitelist based on the destination addresses retrieved from server 140. Actions at block 405 and block 406 will then be performed. If the MAC address is not on the server whitelist, an empty destination address is returned to network node 120.

In one particular embodiment, the user or the administrator makes a request for updating the network node whitelist via the webpage. The user or the administrator is provided with login information or login device, for example a username and a password or a security token, to gain an access to the webpage. Once the user or the administrator enters the username and password to login the webpage, the user or the administrator is allowed to enter, the desired destination addresses and/or additional information such as information of protocol and "action type" information.

The information of protocol includes TCP, UDP, ICMP and IP and the "action type" information includes "Allow" or "Deny" action. The "Allow" action is to allow data to be transmitted. The "Deny" action is to deny data to be transmitted.

Figure 4B:
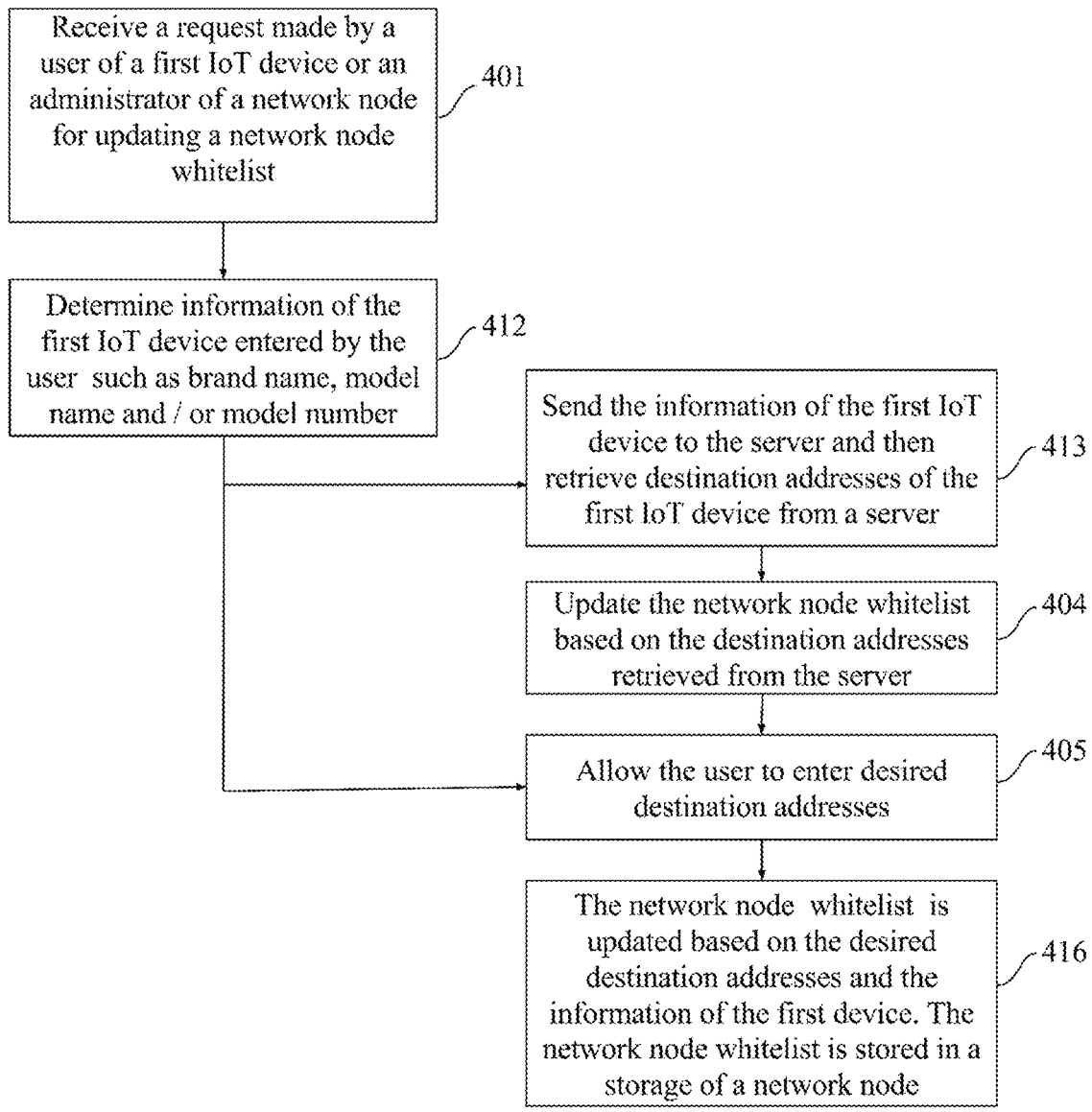
FIG. 4B illustrates an alternative workflow of FIG. 4A to update a network node whitelist based on desired destination addresses and information of an IoT device, entered by a user of the IoT device or an administrator of a network node according to one of the embodiments of the present invention.

FIG. 4B illustrates an alternative workflow of FIG. 4A to update a network node whitelist based on desired destination addresses and information of an IoT device. One of the benefits of the workflow is that users of IoT devices are more convenient to enter information of the IoT devices in order to update the network node whitelist.

At block 401, processing unit 200 receives a request made by a user of IoT device 130 or an administrator of network node 120 for updating a network node whitelist via a webpage. At block 412, the user or the administrator is allowed to enter information of IoT device 130 via the webpage. The user or the administrator is provided with login information or login device, for example a username and a password or a security token, to gain an access to the webpage. Once the user or the administrator enters the username and password to login the webpage, the user or the administrator is allowed to enter the information of IoT device 130 for example a brand name, a model name, a model number, date of manufacture and/or place of manufacture.

Once the user or the administrator enters the information of IoT device 130, actions at block 405 and at block 413 will be performed concurrently. The user or the administrator is allowed to enter desired destination addresses at block 405. At block 416, a network node whitelist is updated based on the desired destination addresses and the information of IoT device 130. The updated network node whitelist is stored in storage 203.

At block 413, processing unit 200 send the information of IoT device 130 to server 14. In one particular embodiment, based on the information of the IoT device 130, if IoT device 130 is one of an IoT device group on a server whitelist, corresponding destination addresses of the IoT device group will be retrieved by processing unit 200 from server 140. At block 404, the network node whitelist is updated based the destination addresses retrieved from server 140. Actions at block 405 and block 416 will then be performed. If the information of IoT device 130 is not on the server whitelist, an empty destination address is returned to network node 120.

In one particular embodiment, the IoT device group includes IoT devices 130, 131 and 133. IoT devices 130, 131 and 133. IoT devices 130, 131 and 133 are connected with network nodes 120, 121 and 122 respectively. IoT devices 130, 131 and 133 share at least one common identifier with each other. For example, the identifier includes a brand name, a model name, a model number, date of manufacture, place of manufacture. In one example, IoT devices 130, 131 and 133 have the same brand name. In another example, IoT devices 130, 131 and 133 have the same brand name with the same model name and/or model number.

The brand name is used for grouping IoT devices that are manufactured and managed by a same vendor. The model name and/or model number is used to further identify or categorize IoT devices from the same vendor. The date of manufacture and/or place of manufacture is also used for further identification and categorization.

To facilitate the user or the administrator to input the information of the IoT device, a pull-down menu or scrollable list is provided in the webpage. The pull-down menu or scrollable list contains one or more input fields. In one particular embodiment, the field includes a brand name field, a model name field, a model number field, a date of manufacture field and/or a place of manufacture field. The brand name field, model name field and model number contain the brand names, model names, model numbers for the IoT devices group respectively. There is no limitation how many input fields are used. For example, the brand name field and model name field are used together or the brand name field, model name field and model number field are used together.

In one particular embodiment, the user or the administrator selects a corresponding brand name for IoT device 130 at the brand name field by pulling down a bar or scrolling down a bar. The user or the administrator then selects model name for IoT device 130 at the model name field. The user or the administrator then selects the model number for the IoT device 130 at the model number field.

Figure 5A:
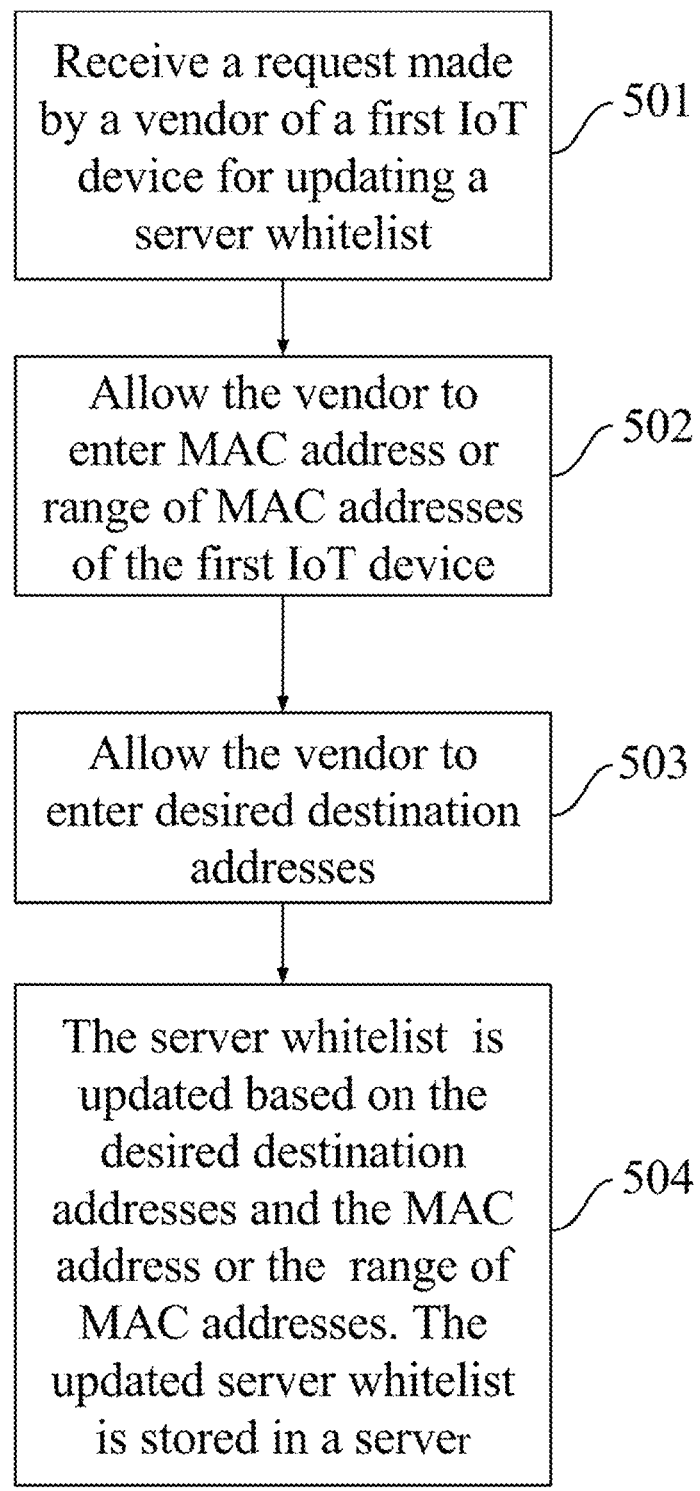
FIG. 5A illustrates a workflow of updating a server whitelist by a vendor of an IoT device at a server, based on MAC address or a range of MAC addresses of IoT device according to one of the embodiments of the present invention.

FIG. 5A illustrates an exemplary embodiment of a workflow of updating a server whitelist by a vendor of an IoT device based on MAC address or a range of MAC addresses of the IoT device. The server whitelist is stored in a server provided by a whitelist service provider. One of the benefits of the workflow is that the latest destination addresses are obtained from the vendor.

At block 501, server 150 receives a request made by a vendor of IoT device 130 for updating a server whitelist via a webpage. At block 502, the vendor is allowed to enter MAC address or a range of MAC addresses of IoT device 130 via the webpage. At block 503, the vendor is allowed to enter desired destination addresses. At block 504, a server whitelist is updated based on the desired destination addresses and the MAC address or the range of MAC address. The updated server whitelist is stored in server 150.

The whitelist at server 150 is inputted by the vendor via a webpage. The whitelist service provider requires the vendor to provide OUI and other documents to prove the vendor's identity and authority, such as business registration documents, in order to grant access right of the input interface to the vendor. Once the identity of the vendor is authenticated, the whitelist service provider furnishes login information or login device to the vendor, for example a username and a password or a security token to gain an access to the webpage. Once the vendor enters the username and password to login the webpage, the vendor is allowed to enter the MAC address or the range of the MAC addresses and the desired destination addresses such as URL, domain name and IP address, in order to update its server whitelist.

Figure 5B:
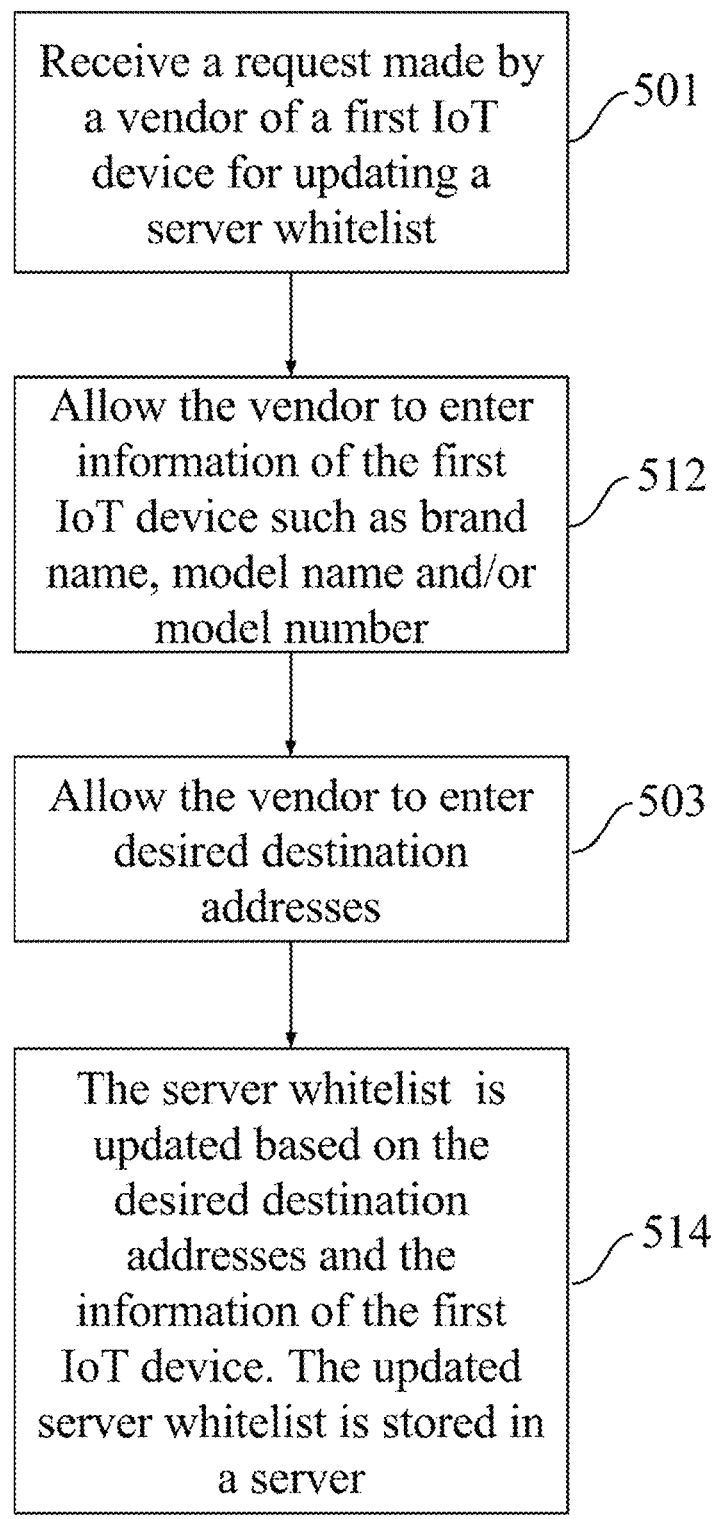
FIG. 5B illustrates an alternative workflow of FIG. 5A to update a server whitelist by a vendor of an IoT device at a server based on information of the IoT device according to one of the embodiments of the present invention.

FIG. 5B illustrates an exemplary embodiment of an alternative workflow of FIG. 5A to update a server whitelist by a vendor of an IoT device at a server based on information of the IoT device. One of the benefits of the workflow is that procedures of inputting the information of the IoT device are simple.

At block 501, server 150 receives a request made by a vendor of IoT device 130 for updating a whitelist via a webpage. At block 512, the vendor is provided with login information or login device, for example a username and a password or a security token, to gain an access to the webpage. Once the vendor enters the username and password to login the webpage, the vendor is allowed to enter information of the IoT device 130 includes, for example brand name, model name, model number, date of manufacture, place of manufacture via a pull-down menu or scrollable list.

At block 503, the vendor is allowed to enter desired destination addresses. At block 514, a server whitelist is updated based on the desired destination addresses and the information of IoT device 130. The updated server whitelist is stored in server 150.

Figure 6:
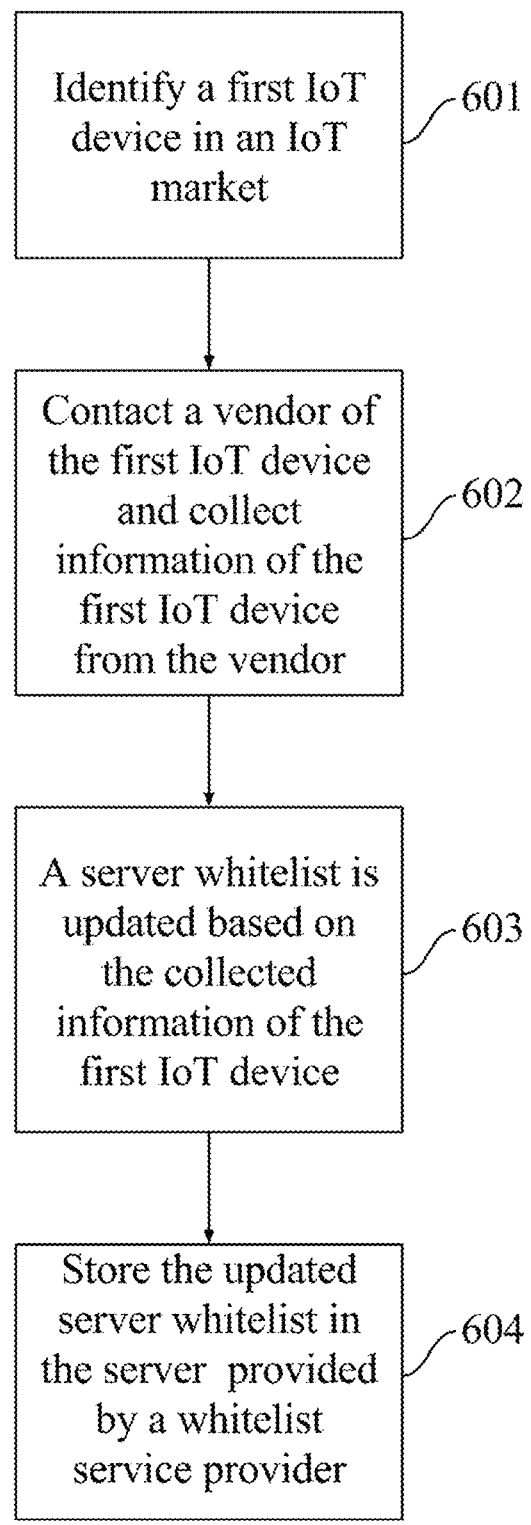
FIG. 6 illustrates a workflow of updating a server whitelist at a server by a whitelist service provider based on information of the IoT device collected from a vendor of the IoT device according to one of the embodiments of the present invention.

FIG. 6 illustrates an exemplary embodiment of workflow of updating a server whitelist based on information of IoT devices collected by a whitelist service provider. One of the benefits of the workflow is that a vendor of IoT devices is not required to enter information of the IoT devices.

At block 601, a whitelist service provider monitors an IoT device market and identifies any IoT devices missing from a whitelist managed by itself on a daily basis. For example, IoT device 130 is missing from a server whitelist stored in server 150. At block 602, the whitelist service provider contacts a vendor of IoT device 130 and collects information of IoT device 130 from the vendor.

The collected information of IoT device 130 includes, for example, brand name, model name, model number, serial number, date of manufacture, place of manufacture, MAC address, information of desired destination addresses (URL, domain name and IP address). At block 603, the whitelist service provider updates the server whitelist based on the collected information of IoT device 130. At block 604, the updated server whitelist is stored in server 150.

In one particular embodiment, a vendor of network node 120 subscribes a whitelist service that includes the whitelist for IoT device 130. Network node 120 is allowed to communicate with server 150 and retrieve the information of the server whitelist from server 150. Network node 120 updates a network node whitelist based on the information retrieved from server 150. The updated network node whitelist is stored in secondary storage 203 and is used by network node 120 to allow data packets to be transmitted to destination addresses on the network node whitelist.

The invention claimed is:

1. A method for updating a network node whitelist at a network node, comprising the steps of:
   A) receiving data packets from an apparatus;
   B) determining a Media Access Control (MAC) address of the apparatus;
   C) determining whether the MAC address of the apparatus is on the network node whitelist;

D) when the MAC address of the apparatus is not on the network node whitelist:
  a) starting a time period; and
  b) during the time period:
    i) identifying at least one destination address of the data packets; and
    ii) updating the network node whitelist based on the at least one destination address of the data packets and the MAC address of the apparatus;
E) when the network node whitelist is reset:
  the at least one destination address on the network node whitelist is not removed; and
  if at least one new destination address is learnt, then the at least one new destination address is added to the network node whitelist;
  wherein the reset is based on an instruction received to reset the time period from an administrator of the network node;
F) when the MAC address of the apparatus is on the network node whitelist:
  a) determining whether the data packets are received within the time period; and
  b) when the data packets are received within the time period:
    i) identifying the at least one destination address of the data packets; and
    ii) updating the network node whitelist based on the at least one destination address of the data packets and the MAC address of the apparatus;
wherein:
  the time period is a period of time to identify the at least one destination address of the received data packets;
  the updated network node whitelist is stored in a non-transitory computer readable storage medium in the network node; and
  the network node restricts data packet transmission by the apparatus based on the updated network node whitelist after expiration of the time period.

2. The method of claim 1, wherein the time period is less than one hour.

3. The method of claim 1, wherein the network node whitelist is required to be approved by a user if deficiencies in the network node whitelist are identified.

4. The method of claim 1, wherein the at least one destination address includes at least one Internet Protocol (IP) address or Uniform Resource Locator (URL).

5. The method of claim 1, further comprising:
F) b) iii) identifying a maximum allowed data packet transmission rate of the apparatus; and
  updating the network node whitelist with the maximum allowed data packet transmission rate of the apparatus.

6. The method of claim 5, further comprising:
G) determining a total data packet transmission rate of the apparatus to the at least one destination address on the network node whitelist;
wherein:
  the maximum allowed data packet transmission rate of the apparatus is used for limiting a data transmission rate of the apparatus to the at least one destination address on the network node whitelist; and
  no data packets from the apparatus are allowed to be transmitted to at least one destination address not on the network node whitelist.

7. The method of claim 1, wherein the network node whitelist comprises the MAC address of the apparatus.

8. The method of claim 1, wherein a user interface for the network node is provided for the administrator to send the instruction to reset the time period.

9. The method of claim 1, further comprising:
D) c) determining whether the MAC address or an Organizationally Unique Identifier (OUI) of the MAC address of the apparatus is on a server whitelist; and
D) d) when the MAC address or the OUI of the MAC address of the apparatus is on the server whitelist:
  retrieving the at least one destination address from the server; and
  updating the network node whitelist based on the at least one destination address retrieved from the server;
wherein the starting the time period and the determining whether the MAC address or the Organizationally Unique Identifier (OUI) of the MAC address of the apparatus is on the server whitelist are performed concurrently; and
wherein the at least one destination address from the server is selected based on a manufacturer of the apparatus.

10. A method for providing at least one destination address of an apparatus to a network node at a server, wherein the at least one destination address is on a server whitelist, comprising the steps of:
  a) receiving, by the server, a request from the network node, wherein the request includes a Media Access Control (MAC) address of the apparatus; and
  b) when the MAC address of the apparatus is on the server whitelist:
    i) retrieving, by the server, at least one destination address and maximum allowed data transmission rate of the apparatus based on the MAC address of the apparatus; and
    ii) sending, by the server, the at least one destination address and the maximum allowed data transmission rate of the apparatus to the network node; and
  c) when the MAC address of the apparatus is not on the server whitelist, returning, by the server, an empty destination address to the network node;
wherein:
  the at least one destination address is for updating a network node whitelist of the network node;
  the request is received when the MAC address of the apparatus is not on the network node whitelist;
  the server whitelist is stored in the server;
  the server whitelist is based on manufacturer of the apparatus; and
  the network node whitelist is stored in the network node.

11. A method of claim 10, wherein the server whitelist at the server further includes at least one of a brand name, a model name, or a model number of the apparatus.

12. A network node for updating a network node whitelist, comprising:
  at least one network interface;
  at least one processing unit;
  at least one main memory; and
  at least one secondary storage storing program instructions executable by the at least one processing unit and configured to cause the at least one processing unit to perform the steps of:
    A) receiving data packets from an apparatus;
    B) determining a Media Access Control (MAC) address of the apparatus;

C) determining whether the MAC address of the apparatus is on the network node whitelist;
D) when the MAC address of the apparatus is not on the network node whitelist:
   a) starting a time period; and
   b) during the time period:
      i) identifying at least one destination address of the data packets; and
      ii) updating the network node whitelist based on the at least one destination address of the data packets and the MAC address of the apparatus;
E) when the network node whitelist is reset:
   the at least one destination address on the network node whitelist is not removed; and
   if at least one new destination address is learnt, then the at least one new destination address is added to the network node whitelist;
   wherein the resetting is based on an instruction received to reset the time period from an administrator of the network node; and
F) when the MAC address of the apparatus is on the network node whitelist:
   c) determining whether the data packets are received within the time period; and
   d) when the data packets are received within the time period:
      i) identifying the at least one destination address of the data packets; and
      ii) updating the network node whitelist based on the at least one destination address of the data packets and the MAC address of the apparatus;
wherein:
   the time period is a period of time to identify at least one destination address of the received data packets;
   the updated network node whitelist is stored in non-transitory computer readable storage medium in the network node; and
   the network node restricts data packet transmission by the apparatus based on the updated network node whitelist after expiration of the time period.

13. The network node of claim 12, wherein the time period is less than one hour.

14. The network node of claim 12, wherein the network node whitelist is required to be approved by a user if deficiencies in the network node whitelist are identified.

15. The network node of claim 12, wherein the at least one destination address includes at least one Internet Protocol (IP) address or Uniform Resource Locator (URL).

16. The network node of claim 12, wherein the secondary storage further stores program instructions that when executed by the at least one processing unit cause the at least one processing unit to perform:
   F) b) iii) identifying a maximum allowed data packet transmission rate of the apparatus; and
   updating the network node whitelist with the maximum allowed data packet transmission rate of the apparatus.

17. The network node of claim 16, wherein the secondary storage further stores program instructions that when executed by the at least one processing unit cause the at least one processing unit to perform:
   G) determining a total data packet transmission rate of the apparatus to the at least one destination address on the network node whitelist;
wherein:
   the maximum allowed data packet transmission rate of the apparatus is used for limiting a data transmission rate of the apparatus to the at least one destination address on the network node whitelist; and
   no data packets from the apparatus are allowed to be transmitted to at least one destination address not on the network node whitelist.

18. The network node of claim 12, wherein the network node whitelist comprises the MAC address of the apparatus.

19. The network node of claim 12, wherein a user interface for the network node is provided for the administrator to send the instruction to reset the time period.

20. The network node of claim 12, wherein the secondary storage further stores program instructions that when executed by the at least one processing unit cause the at least one processing unit to perform:
   D) c) determining whether the MAC address or an Organizationally Unique Identifier (OUI) of the MAC address of the apparatus is on a server whitelist; and
   D) d) when the MAC address or the OUI of the MAC address of the apparatus is the server whitelist:
      retrieving the at least one destination address from the server; and
      updating the network node whitelist based on the at least one destination address retrieved from the server;
   wherein the starting the time period and the determining whether the MAC address or the Organizationally Unique Identifier (OUI) of the MAC address of the apparatus is on the server whitelist are performed concurrently; and
   the at least one destination address from the server is selected based on a manufacturer of the apparatus.

21. The method of claim 1, wherein the apparatus is an Internet of Things (IoT) device.

* * * * *